Sept. 8, 1931.　　　　　M. COUADE　　　　　1,821,930
CINEMATOGRAPHIC PROJECTOR
Filed July 16, 1927　　2 Sheets-Sheet 1

Sept. 8, 1931.  M. COUADE  1,821,930
CINEMATOGRAPHIC PROJECTOR
Filed July 16, 1927  2 Sheets-Sheet 2

Inventor
Maurice Couade

Patented Sept. 8, 1931

1,821,930

UNITED STATES PATENT OFFICE

MAURICE COUADE, OF PARIS, FRANCE

CINEMATOGRAPHIC PROJECTOR

Application filed July 16, 1927, Serial No. 206,303, and in France July 17, 1926.

This invention relates to improvements in cinematographic apparatus, especially cinematographic projectors, and its object is to effect improvements in the construction of the film feeding mechanism whereby the efficiency and reliability of such mechanism are increased.

With the above and other objects in view, the invention consists in the construction, combination and arrangement of devices hereinafter described and claimed.

In the drawings

Figure 3 is a detail elevation partly in section of the film feeding mechanism.

Figure 1:
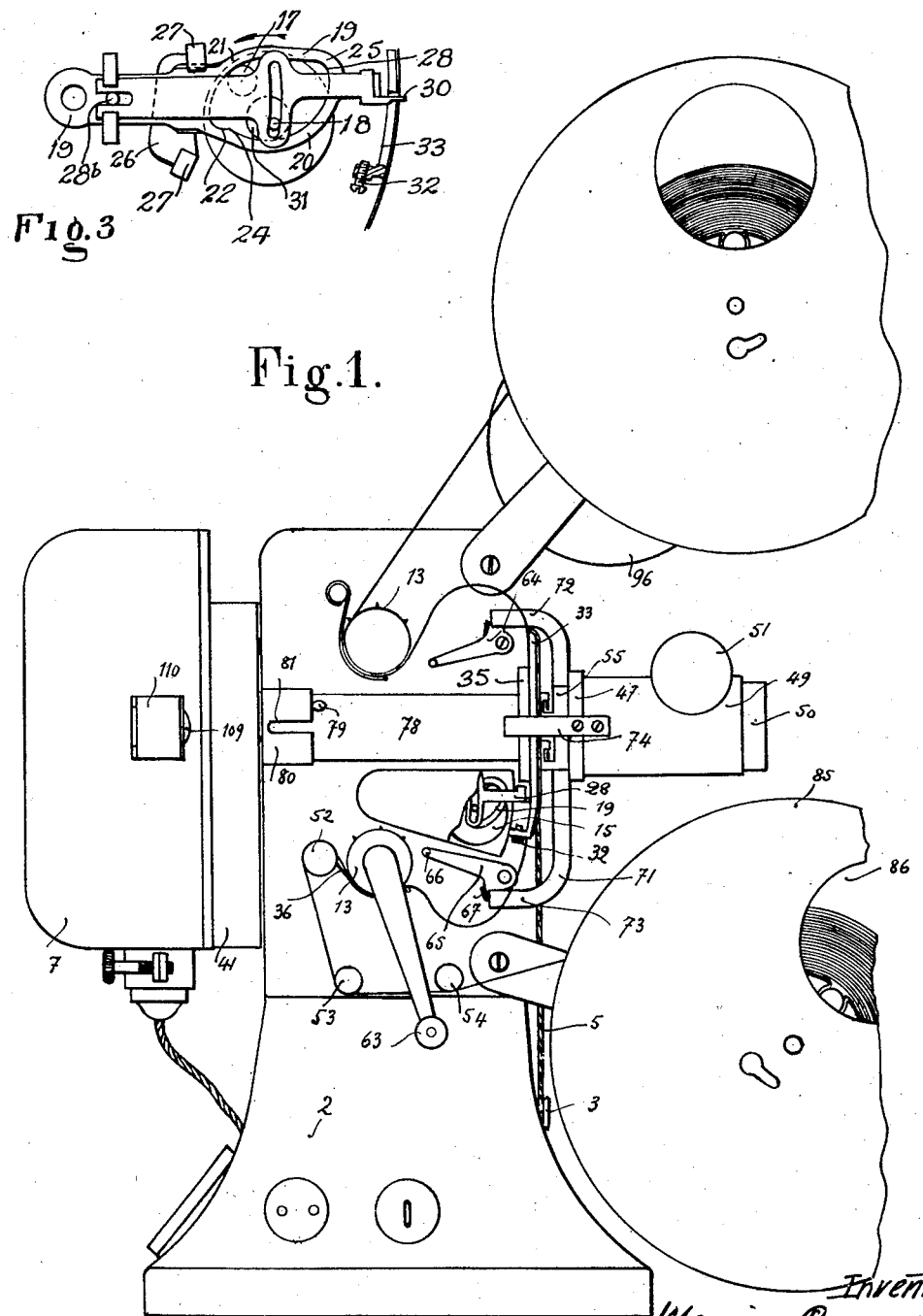
Figure 1 is an elevation of an apparatus constructed and arranged in accordance with this invention.

The mechanism of the projector comprises a main shaft 1 carrying the obturator, parallel to the optical axis and moved by the motor, and the gearing connecting mechanically this shaft with members of the mechanism for the intermittent advance of the film.

1 is the main shaft moved by a universal motor contained in the casing 2 of the projector and transmitting its motion by means of pulleys 3 and 4 and belt 5. This shaft is provided at the front end with a knurled button 6 serving for the manual starting of the apparatus. The shaft is also prolonged to the rear so as to extend into the lantern 7. This rear prolongation 8 is shown in dotted lines in Figure 2 and is provided with a removable handle 9.

10 is an endless screw with threads at 45° and fixed on the main shaft. This screw moves the pinions 11, 12 mounted on axles of the film guiding sprockets 13 (Figure 1).

Figure 2:
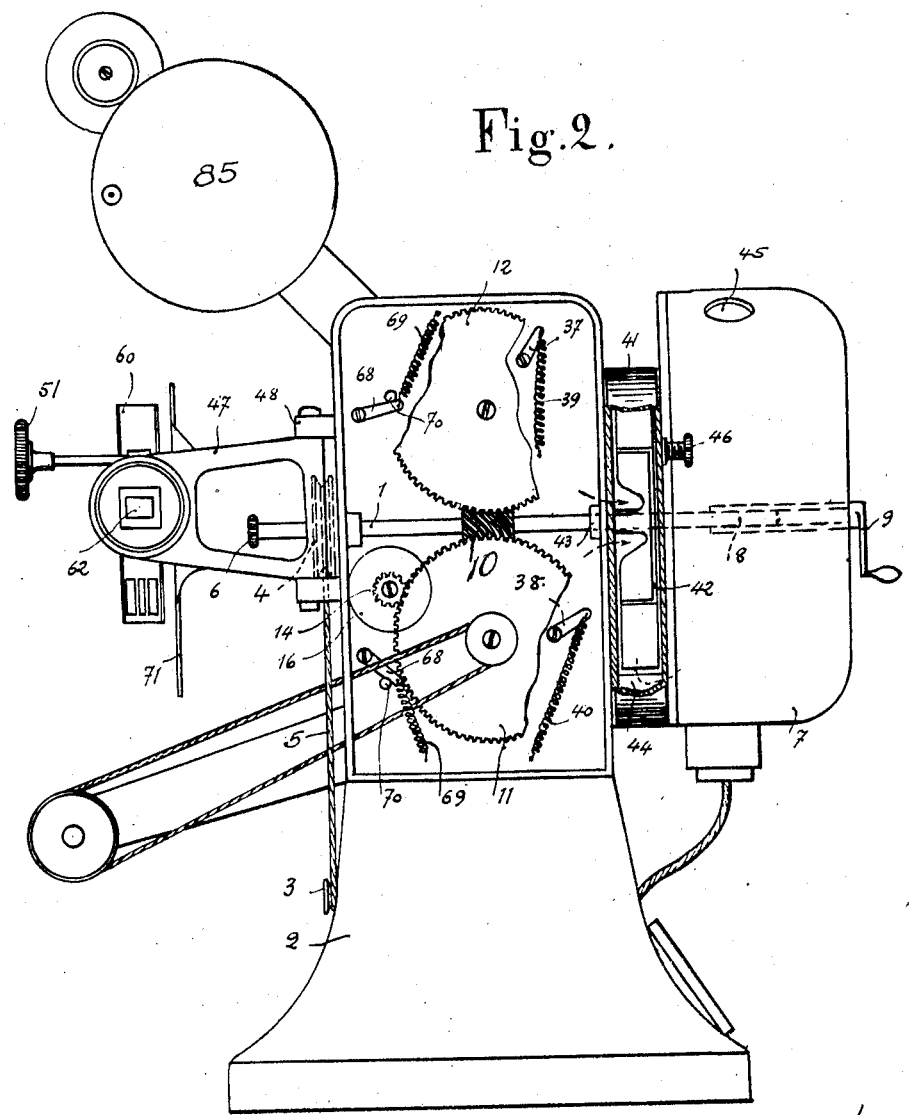
Figure 2 is a similar view of the reverse side of the apparatus partly in section.

14 is a pinion with teeth cut at 45°, shown in dotted lines in Figure 2 and meshing with the lower pinion 11. The pinion 14 is fitted on the axle of the rotary disc 15 of the mechanism for feeding the film. On the same axle is mounted a fly wheel 16.

The mechanism for the intermittent actuation of the film is shown in detail in Figure 3 and partly in Figure 1. Said disc 15 revolves in the direction indicated by the arrow and carries two pins 17, 18. An oscillating lever 19 as light as possible is fitted frictionally on its axle and is acted upon by the pin 17 to impart to and fro motion to the lever. Said lever has a cam opening 19 limited by two curves 20 and 21 of great radius, along which the pin 17 travels and hence displaces the lever, and two arcs 22, 23 of slight radius connecting the arcs 20, 21 and having the same radius as the pin 17. These arcs 22, 23 receive the shock of the pin 17 along their entire surface, the one at the commencement of the descending motion of the lever and the other at the beginning of its ascending movement. The four arcs of the curve are also connected by curves 24 of small radius and by a straight line or a curve 25 of great radius. These curves 24, 25 serve to reduce progressively the speed of the lever, one of these curves at the end of the descending and the other at the end of the ascending movement thereof. 26 is a flat slide carrying two elastic jaws 27, 27', the lever entering with friction the one 27' toward the end of the descending movement and the other 27 toward the end of the ascending movement. These braking means add themselves to the braking of the lever on its axle and of the film in its guide. The speed of the lever is reduced by this means when the same approaches its extreme positions.

The mechanism also comprises a claw member 28 which is as light as is practicable and which slides longitudinally on the oscillating lever, and is provided at its inner end with a slot 28ª which is engaged by a stud 28ᵇ which projects from the lever 19. Claw lever 28 has a transverse slot 29 which is engaged by the pin 18, which pin is eccentric to a circular projection 31 of the disc 15 and which projection is concentric with said disc. Said pin 18 is active to impart to the claw 30 at the outer end of lever 28 penetrating movement into the film perforations and its withdrawal movement, as will be understood. The diameter of the projection 31 is such that the great arcs 20, 21 are successively in contact with the same, each when the pin slides on the other arc. In this manner this projection limits the stroke of the lever 19 in both directions. 32 is an adjustable abutment fixed for example on the immovable guide 33 attached to the framing. The claw member 28 touches this abutment at the end of the descending motion of the lever. This abutment contributes to assure the fixity of the projection.

35, 36 are two pressers for the film, to secure required frictional contact between the film and the sprockets 13, and actuated for their opening and closing by levers 37, 38 and springs 39, 40 (Figure 2) placed in the interior of the casing containing the mechanism.

41 is the body of the ventilator of usual form. In this body of the ventilator revolves a winged disc 42 forming at the same time the obturator. Air is sucked in the center of the casing of the mechanism through apertures not represented and situated at both sides of a bossage 43, through which passes the main shaft. A lower inclined wall 44 obliges the air driven radially by the wings to enter the lantern wherefrom it escapes above through openings 45 (Figure 2).

In Figure 2 the dotted arrows indicate the air movement.

On the rear wall of the ventilator body, outwardly of the lantern is a suitable brake such as indicated at 46, which serves to regulate the speed of the motor.

47 (Figure 1) is the door for the film, movable around hinges 48.

The object glass 50 is provided in a cylindrical fitting 49 carried by said door in front of the same.

51 indicates the knurled button forming part of the usual means for adjusting the object glass.

52 is a roller loose on the axle of the presser 36, 53, 54 (Figure 1) indicate loose direction rollers.

The film door carries in the front part the support 55 of the presser framing. The presser framing is indicated at 60. 62 is the film window. 63 is a handle on the axle of the lower guide 13 and enables the projector to be manually actuated.

The projector includes means to form the two film buckles of suitable length and comprises two members 64, 65 (Figure 1) movable around axes parallel to those of the guide sprockets 13. Each of these members carries at right angles a long finger 66 parallel to the axes of the guide sprockets 13 and also has a short lug 67.

On the axle of each of the pieces 64 and 65, in the interior of the casing of the mechanism, is mounted a lever 68 to the extremity of which a traction spring 69 is attached.

Each of the pieces 64 and 65 can occupy either of two positions, one for charging, in which by passing over the fingers 66 the film is stretched between the guide 13 and the fixed duct, and bent to form bights, as shown, and arranged for the run.

In the charging position the lever 68 is applied against the abutment 70 by the spring 69. The parts 64, 65 are pushed and maintained in the running position by a pusher 71 fixed to the door of the film and acting with its extremities 72, 73 upon the short lugs 67.

The latch 74 of the door lock maintains the members 64, 65 in this position for the run. The reels for the film are indicated at 85.

The projector embodying my improved mechanism for feeding the film is particularly suitable for the use of narrow films with a small pitch between the images.

What I claim is:—

1. In a cinematographic projector, a film guide having an opening, a member having a claw to operate in said opening and to be projected through and withdrawn from a film, said member being mounted for longitudinal reciprocating movement and also for transverse reciprocating movement and being provided with a transverse slot, a lever mounted for oscillating movement and on which the first named member is slidably mounted, said lever having a cam opening and a driven revoluble element having a pin member operating in said cam opening on cam surfaces presented by the downward wall of said opening, said revoluble element also having a circular projection arranged in said cam opening and forming a stop to limit transverse movements of the oscillating lever, said projection being provided with an eccentrically arranged stud operating in the transverse slot of the claw member.

2. In a cinematographic projector, a film guide having an opening, a member having a claw to operate in said opening and to be projected through and withdrawn from a film, said member being mounted for longitudinal reciprocating movement and also for transverse reciprocating movement and being provided with a transverse slot, a lever mounted for oscillating movement and on which the first named member is slidably mounted, said lever having a cam opening, a driven revoluble element having a pin operating in said cam opening on cam surfaces presented by the wall thereof, said revoluble element also having an eccentrically arranged stud operating in the transverse slot of the claw member, and cushioning stop members arranged at opposite sides of the claw member and an adjustable stop member at the lower end of the opening in the film guide to limit the extent of the transverse movement of the claw member.

3. In a cinematographic projector, a film guide having an opening, a member having a claw to operate in said opening and to be projected through and withdrawn from a film, said member being mounted for longitudinal reciprocating movement and also for transverse reciprocating movement and being provided with a transverse slot, a lever mounted for oscillating movement and on which the first named member is slidably mounted, said lever having a cam opening presenting two opposing concave cam surfaces of relatively large radius arranged at different distances from the free end of said lever and the cords of which are substantially parallel with each other and inclined to the axis of said lever and to concave curves of relatively slight radius arranged in the angles between and connecting the first named curves, and a driven revoluble element having a pin operating in said cam opening and also having a circular centrally arranged projection extending into said cam opening and provided with an eccentrically arranged stud operating in the transverse slot of the claw member.

In witness whereof I affix my signature.

MAURICE COUADE.